United States Patent
Chapman et al.

(10) Patent No.: US 12,061,857 B1
(45) Date of Patent: Aug. 13, 2024

(54) POST-CTS INSERTION DELAY AND SKEW TARGET REFORMULATION OF CLOCK TREE

(71) Applicant: Cadence Design Systems, Inc., San Jose, CA (US)

(72) Inventors: Andrew Mark Chapman, Milton (GB); Charles Jay Alpert, Cedar Park, TX (US); Andrew Hall, Cambridge (GB)

(73) Assignee: Cadence Design Systems, Inc., San Jose, CA (US)

( * ) Notice: Subject to any disclaimer, the term of this patent is extended or adjusted under 35 U.S.C. 154(b) by 220 days.

(21) Appl. No.: 17/829,099

(22) Filed: May 31, 2022

(51) Int. Cl.
  *G06F 30/396* (2020.01)
  *G06F 1/10* (2006.01)
  *G06F 119/12* (2020.01)

(52) U.S. Cl.
  CPC .............. *G06F 30/396* (2020.01); *G06F 1/10* (2013.01); *G06F 2119/12* (2020.01)

(58) Field of Classification Search
  USPC ........................................................ 716/108
  See application file for complete search history.

(56) References Cited

U.S. PATENT DOCUMENTS

2003/0182634 A1* 9/2003 Chang ..................... G06F 1/10
                                                         716/114

* cited by examiner

Primary Examiner — Bryce M Aisaka
(74) Attorney, Agent, or Firm — Schwegman Lundberg & Woessner, P.A.

(57) ABSTRACT

Methods and systems for performing post clock tree synthesis (CTS) of a clock tree include accessing, from memory, an integrated circuit design comprising a clock tree interconnecting a clock source to a plurality of clock sinks. Each clock sink has an associated current insertion delay. A mean insertion delay of the plurality of clock sinks is determined based on the associated current insertion delays of the clock sinks. A target insertion delay for the clock sinks is set based on the mean insertion delay and a target insertion delay adjustment determined for each individual clock sink. One or more clock sinks are identified that have a target insertion delay adjustment exceeding a skew threshold value. The clock tree is modified to reduce the target insertion delay adjustment, for each identified clock sink of the one or more clock sinks, to less than or equal to the skew threshold value.

20 Claims, 10 Drawing Sheets

POST-CTS INSERTION DELAY AND SKEW TARGET REFORMULATION OF CLOCK TREE

TECHNICAL FIELD

The present disclosure generally relates to the technical field of integrated circuit design. In particular, the present disclosure addresses systems and methods for performing post-clock tree synthesis (CTS) reformulation of insertion delay and skew targets of the clock tree.

BACKGROUND

An integrated circuit (IC) layout specifies portions of various components of an IC. An IC typically includes a large number of registers, latches, flip-flops and/or other types of clocked devices, which are referred to herein generally as "clock sinks," ("sinks"). These clock sinks must be clocked by one or more clock signals in the IC, and the IC must include one or more clock trees for distributing a clock signal from a clock source to all of the clock sinks to be clocked by the clock signal. A clock tree distributes a clock signal from its root node to a set of clock sinks within an IC through a branching network of drivers (e.g., buffers or inverters). A single driver distributes the clock signal to a grouping of other drivers and/or clock sinks. Connectivity between a driver and its fanout to other drivers or sinks is represented by a "clock net" and will be physically implemented by routed conductive traces, which may be referred to simply as "routes" herein. Clock tree synthesis (CTS) is the process of structuring a clock tree to provide the clock signal from the root to all the clock sinks so that the clock signal ideally arrives at, or is received by, all clock sinks at the same time. The need arises regularly to make changes to a synthesized clock tree, such as due to designers of an IC including the clock tree refining or changing their circuit designs, as well as due to the results of testing operation of the IC. Making changes to or modifying a synthesized clock tree is currently a difficult and time-consuming process, and there is accordingly a need for improved techniques for synthesizing clock trees.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

Various ones of the appended drawings merely illustrate example embodiments of the present inventive subject matter and cannot be considered as limiting its scope.

DETAILED DESCRIPTION

Figure 1:
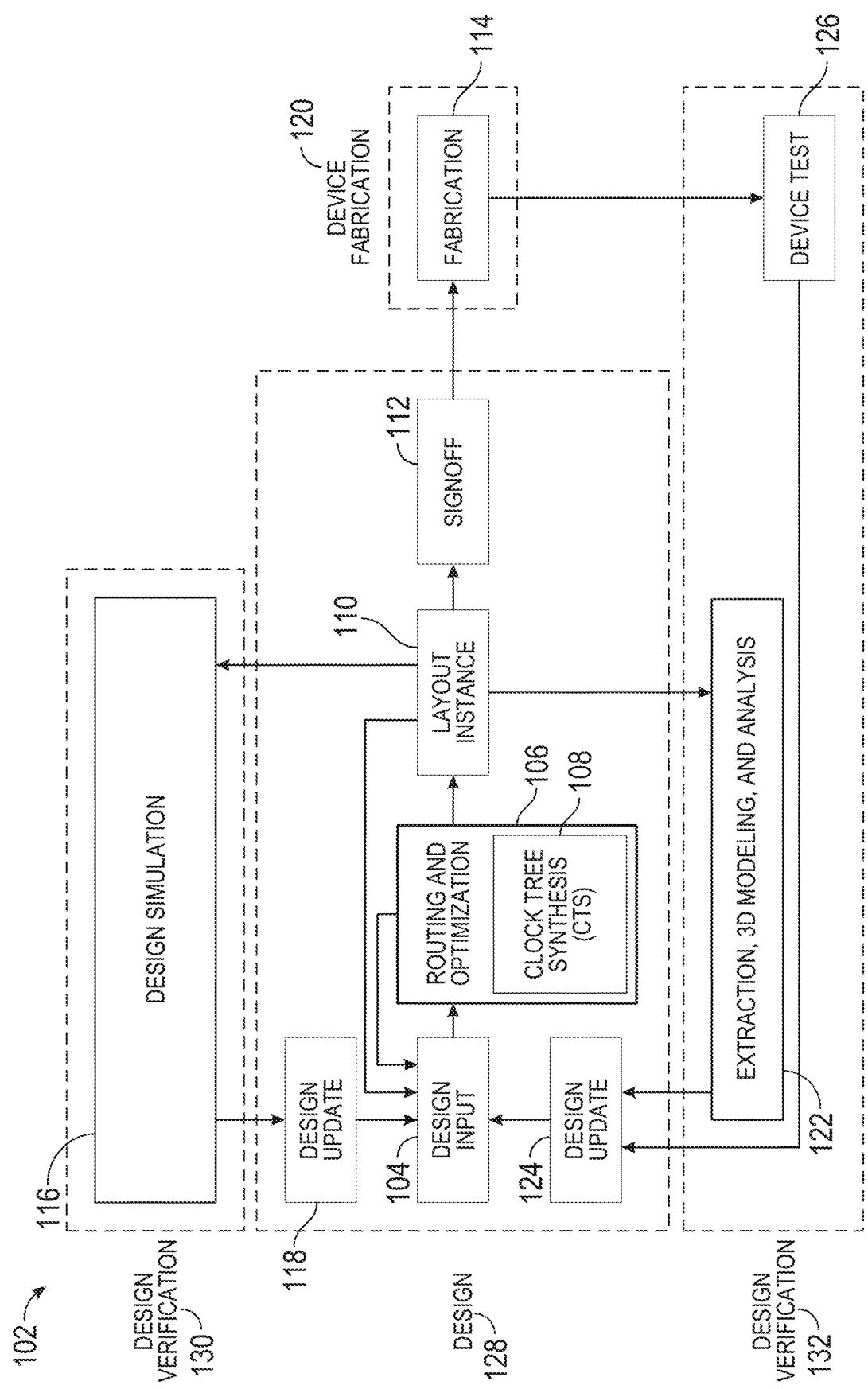
FIG. 1 illustrates an example design process flow that includes post-CTS clock tree modifications to a clock tree, in accordance with some embodiments of the present disclosure.

Reference will now be made in detail to specific example embodiments for carrying out the inventive subject matter. Examples of these specific embodiments are illustrated in the accompanying drawings, and specific details are set forth in the following description in order to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure.

Electronic design automation (EDA) software systems commonly perform clock-tree synthesis (CTS). Conventional approaches to CTS typically include a labor-intensive process that generates a mapping of clock signals to each clock sink within a design. Generally, buffers and inverters are inserted along a clock path to achieve required transition times (i.e., slew) of the clock signal propagating through the clock tree. The clock tree is also structured to meet required insertion delay and skew for the clock sinks. The meaning of the terms slew, insertion delay, and skew of clock sinks in a clock tree are discussed in more detail below. For ICs, a clock tree structure typically consumes 15-30% of total power consumption, and may consume up to approximately half of the total power consumption of the IC. Improved clock tree structures may reduce power consumption the clock tree and thereby help reduce the total power consumption of the IC.

Clock tree synthesis (CTS) is the process of structuring a clock tree to provide the clock signal from the root to all the clock sinks so that the clock signal ideally arrives at or is received by all clock sinks at the same time. The clock signal is said to be a propagated clock signal as the clock signal is communicated from or "propagates" from the root through drivers and conductive traces to the clock sinks. Drivers are included in the clock tree, as required, to ensure the propagated clock signal meets required transition time or slew rate specifications for the clock tree. The clock tree must be structured or synthesized so that the propagated clock signal meets the required slew rate specifications as well as required insertion delay and skew for all the clock sinks in the clock tree. After a clock tree has been synthesized, which will be referred to herein as "post-CTS", modifying the clock tree is a difficult and time-consuming process. While this is true, the need arises regularly to make post-CTS clock tree modifications to the clock tree as designers of an IC including the clock tree refine their circuit designs and test the operation of the IC. There is accordingly a need for improved techniques for making post-CTS clock tree modifications to a clock tree.

Existing techniques in EDA software systems for restructuring or modifying a clock tree after CTS have been limited up to now. As the CTS generates a clock tree in a holistic manner, any restructuring of one clock sink in the clock tree after the generation can impact characteristics of the clock signal applied to other clock sinks in the clock tree. Some modifications to the clock tree post-CTS may be implemented through changing the sizing of buffers to adjust or modify slew or transition times of the propagating clock signal. This approach of adding, removing, or resizing of buffers is impracticable to implement, however, to adjust numerous targeted individual clock sinks throughout the clock tree. This is true because of the consequences of adjustments to fix one parameter or design rule of the clock tree may cause other design rules to be violated. For example, a design rule violation (DRV), such as a slew rate or transition time violation, of a given clock sink in the clock tree may be fixed, for example, by increasing a size of a buffer driving the clock signal applied to the clock sink. A larger buffer will reduce the transition time of the applied clock signal, but this will also reduce the insertion delay of the clock sink, which may undesirably increase the skew of this clock sink. Another example is adding a buffer to fix a slew violation of the clock signal being applied to a given clock sink may increase the insertion delay as well as the skew of the clock sink.

EDA software systems have conventionally not allowed for restructuring or modifications to a post-CTS clock tree. More recently, EDA software systems have implemented techniques for restructuring or modifying a post-CTS clock tree, without once again performing clock tree synthesis, based on designer or user supplied targets. Ideally, the EDA software system would, without once again performing clock tree synthesis and without requiring designer input, analyze the synthesized clock tree and automatically modify the clock tree to eliminate violations of specified design parameters for the clock tree. In addition, ideally these post-CTS clock tree modifications would minimize or reduce the number of post-CTS physical modifications to the clock tree. This is true because any physical modifications to the post-CTS clock tree, which are physical changes to the structure of the clock tree, will cause further unwanted changes to parameters of the clock tree. For example, if the clock tree is restructured by moving a location of a given clock sink CS to reduce the insertion delay ID of this clock sink, unwanted variations to the parameters of neighboring clock sinks CS will invariable result due to this restructuring. The restructuring may, for example, undesirably increase the insertion delays ID of some of the neighboring clock sinks CS. These unwanted variations in the parameters of neighboring clock sinks CS may arise due to a variety of different factors, such as changes to lengths of conductive routes supplying the propagated clock signal to the neighboring clock sinks CS, or changes in capacitive or inductive coupling of a conductive routes due to changes in the placements of these conductive routes as part of the restructuring process.

Embodiments of the present disclosure are directed to EDA software systems that implement techniques for automatically modifying a post-CTS clock tree to eliminate violations of specified insertion delay ID and skew design parameters for the clock tree. The disclosed techniques also reduce the number of modifications to the post-CTS clock tree that are necessary for the post-CTS clock tree to satisfy specified insertion delay and skew parameters for the clock tree. Briefly, in embodiments of the present application, a mean insertion delay ID of all the clock sinks CS in the clock tree is utilized in setting a target insertion delay for the clock sinks to identify clock sinks requiring physical modification. In this way, embodiments of the present disclosure identify clock sinks in the post-CTS clock tree that must be adjusted or modified in a way that reduces the number of post-CTS modifications required for the clock tree to satisfy the specified insertion delay and skew parameters, as will be described in more detail below. Embodiments of the present disclosure allow for post-CTS modifications to the clock tree while eliminating the need for designer input relating to these modification as well as eliminating the need to perform the time and resource intensive process of again performing CTS to generate a new clock tree.

In accordance with some embodiments of the present disclosure, a system includes one or more processors and a memory storing instructions that, when executed by the one or more processors, cause the system to access an integrated circuit design stored in the memory. The integrated circuit design includes a clock tree that includes routes that interconnect a clock source to a plurality of clock sinks. Each clock sink has an associated current insertion delay. A mean insertion delay of the plurality of clock sinks is determined and a target insertion delay is set for each of the plurality of clock sinks based on the determined mean insertion delay. A target insertion delay adjustment for each of the plurality of clock sinks is determined and clock sinks having a target insertion delay adjustment exceeds a skew threshold value are identified. The clock tree is then modified to reduce the target insertion delay adjustment for each identified clock sink to less than or equal to the skew threshold value.

In accordance with further embodiments of the present disclosure, a method includes accessing an integrated circuit design stored in memory. The integrated circuit design includes a clock tree that includes routes that interconnect a clock source to a plurality of clock sinks. Each clock sink has an associated current insertion delay. The method further includes determining a mean insertion delay of the plurality of clock sinks and setting a target insertion delay for each of the plurality of clock sinks based on the determined mean insertion delay, determining a target insertion delay adjustment for each of the plurality of clock sinks, identifying clock sinks having a target insertion delay adjustment exceeds a skew threshold value, and modifying the clock tree to reduce the target insertion delay adjustment for each identified clock sink to less than or equal to the skew threshold value.

According to still further embodiments of the present disclosure, a method includes accessing an integrated circuit design stored in memory, where the integrated circuit design includes a clock tree that includes routes that interconnect a clock source to a plurality of clock sinks. Each clock sink has an associated current insertion delay. The method further includes identifying a targeted subset of clock sinks and a non-targeted subset of clock sinks in the plurality of clock sinks. The plurality of clock sinks collectively include the targeted subset of clock sinks and non-targeted subset of clock sinks, where the targeted subset of clock sinks corresponds to clock sinks having current insertion delays that are to be adjusted. The method further includes determining the mean insertion delay of the non-targeted subset of clock sinks, setting a target insertion delay, based on the determined mean insertion delay, for each of the plurality of clock sinks in the targeted subset of clock sinks, determining a target insertion delay adjustment for each of the plurality of clock sinks in the targeted subset of clock sinks, identifying, in the targeted subset of clock sinks, clock sinks having a target insertion delay adjustment exceeding the skew threshold value, and modifying the clock tree to reduce the target insertion delay adjustment for each identified clock sink in the targeted subset of clock sinks to less than or equal to the skew threshold value.

Reference will now be made in detail to specific example embodiments for carrying out the disclosed subject matter. Examples of these specific embodiments are illustrated in the accompanying drawings, and specific details are set forth in the following description in order to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of a method may be performed by one or more processors. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

FIG. 1 is a diagram illustrating an example design process flow 102 of an EDA software system that includes post-CTS clock-tree restructuring in accordance with some embodiments. The terms "restructuring," "reformulating," and "modifying" are used interchangeably herein, and each should be understood to mean an update is being made to an existing clock tree, as described in more detail herein in the embodiments described with reference to FIGS. 1-9. As shown in FIG. 1, the design process flow 102 includes a design phase 128, a device fabrication phase 120, a design verification phase 130, and a device verification phase 132. The design phase 128 involves an initial design input operation 104 where basic elements and functionality of a device, typically an IC, are determined. The initial design input operation 104 may also include revisions to elements or functionality of the device based on various analyses and optimization of a circuit design to be include in the device. This initial design input operation 104 operation is where block instances are used in the circuit design and any additional circuitry for the design around the blocks is selected. The initial strategy, tactics, and context for the device to be created are also generated in the initial design input operation 104, depending on the particular design algorithm being used.

In some embodiments, following an initial selection of design values in the design input operation 104, routing, timing analysis, and optimization are performed in a routing and optimization operation 106, along with any other automated design processes. While the design process flow 102 shows the routing and optimization operation 106 occurring prior to a layout instance operation 110, routing, timing analysis, and optimization in operation 106 may be performed at any time to verify operation of a circuit design. For instance, in various embodiments, timing analysis in a circuit design may be performed prior to routing of connections in the circuit design, after routing, during register transfer level (RTL) operations, or as part of a signoff operation 112, as will be understood by those skilled in the art.

In FIG. 1, the routing and optimization operation 106 includes a clock tree synthesis (CTS) operation 108, which may be performed in accordance with various embodiments described herein. The CTS operation 108 generates a clock tree that delivers a clock signal from a clock tree root node, which is a clock source of a circuit design, to a plurality of clock tree leaf nodes, which correspond to a plurality of clock sinks within the circuit design. Before describing the CTS operation 108 in more detail, the general structures of clock trees and several key parameters of clock trees, namely insertion delay ID and skew SK, will be described in more detail with reference to FIGS. 2 and 3.

Figure 2:
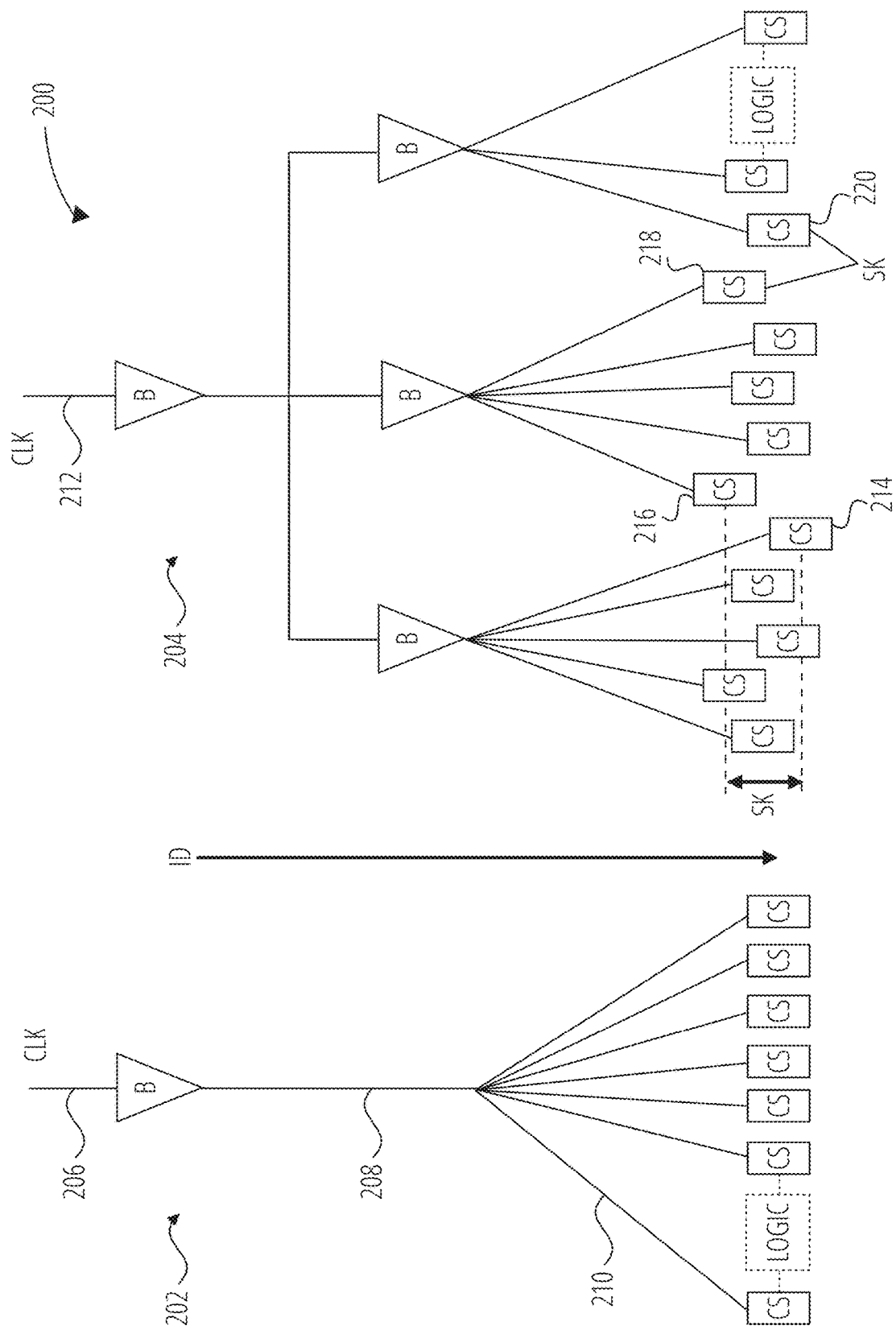
FIG. 2 illustrates examples of buffered and unbuffered clock trees to which post-CTS clock tree modifications may be applied, in accordance with some embodiments of the present disclosure.

FIG. 2 illustrates simplified examples of clock trees 200 along with the insertion delay and skew of clock sinks CS in these clock trees. More specifically, FIG. 2 illustrates simplified versions of an unbuffered clock tree 202 and a buffered clock tree 204. In the unbuffered clock tree 202, a buffer B receives a clock signal CLK on a root node 206 of the clock tree and provides a corresponding clock signal on an output and which is distributed over a plurality of conductive traces or routes 208, 210 (hereafter, conductive routes 208, 210) to provide a propagated clock signal to a plurality of clock sinks CS. The conductive routes 208, 210 correspond to the clock net of the clock tree 202. The insertion delay ID (i.e., clock latency) of each of the clock sinks CS is the delay or time required for the CLK signal to propagate from the root node to the clock sinks CS. The insertion delay ID is illustrated through a downward pointing arrow in FIG. 2, with the value of the insertion delay of clock sinks CS increasing in the downward direction moving further away from the root node 206 of the clock tree.

The buffered clock tree 204 is similar to the unbuffered clock tree 202 except that the buffered clock tree includes additional buffers B for distributing the clock signal CLK to groups of clock sinks CS. There may be millions of clock sinks CS in the clock tree of an IC and thus these clock sinks are commonly divided into groups, each of these groups driven by appropriately sized buffers B in the buffered clock tree 204. Each of the clock trees 202, 204 of FIG. 2 also illustrates logic circuitry coupled between adjacent pairs of clock sinks CS in the respective clock tree. These blocks of logic circuitry, which are shown in dashed lines, are included merely to illustrate that the IC including the clock sinks CS of the clock tree also includes logic circuitry to provide the desired functionality of the IC. During operation of the IC, the clock sinks CS are clocked to, for example, clock data into and out of blocks of logic circuitry. Only a single clock sink CS is shown on either side of the blocks of logic circuitry to simplify the figure, but one skilled in the art will realize that large numbers of clock sinks CS would actually be utilized in clocking data into and out of blocks of logic circuitry.

The buffered clock tree 204 also illustrates the concept of skew among the plurality of clock sinks CS in the clock tree. Skew is the difference in insertion delay ID among the clock sinks CS, and thus indicates differences in time at which respective clock sinks CS receive the propagated clock signal. The unbuffered clock tree 202 shows all clock sinks CS at the same distance from the root node and is assumed to be ideal, meaning zero insertion delay ID and zero skew. In contrast, the clock sinks CS in the buffered clock tree 204 are shown to have varying insertion delays ID, as represented through the different vertical positions of the clock sinks relative to a root node 212. The clock sinks CS in the buffered clock tree 204 accordingly have non-zero skew, which will be the case in physically implemented clock trees. A global skew is represented by skew SK shown in the lower left of buffered clock tree 204, where global skew is the difference between a clock sink 214 having the longest insertion delay ID and a clock sink 216 having the shortest insertion delay. A relative skew between adjacent clock sinks CS, such as clock sinks 218 and 220, is also illustrated. Embodiments of methods and systems utilize the insertion delays ID and skew SK of clock sinks CS in the clock tree to implement post-CTS clock tree modifications in embodiments of the present disclosure, as will be described in more detail below.

Figure 3:
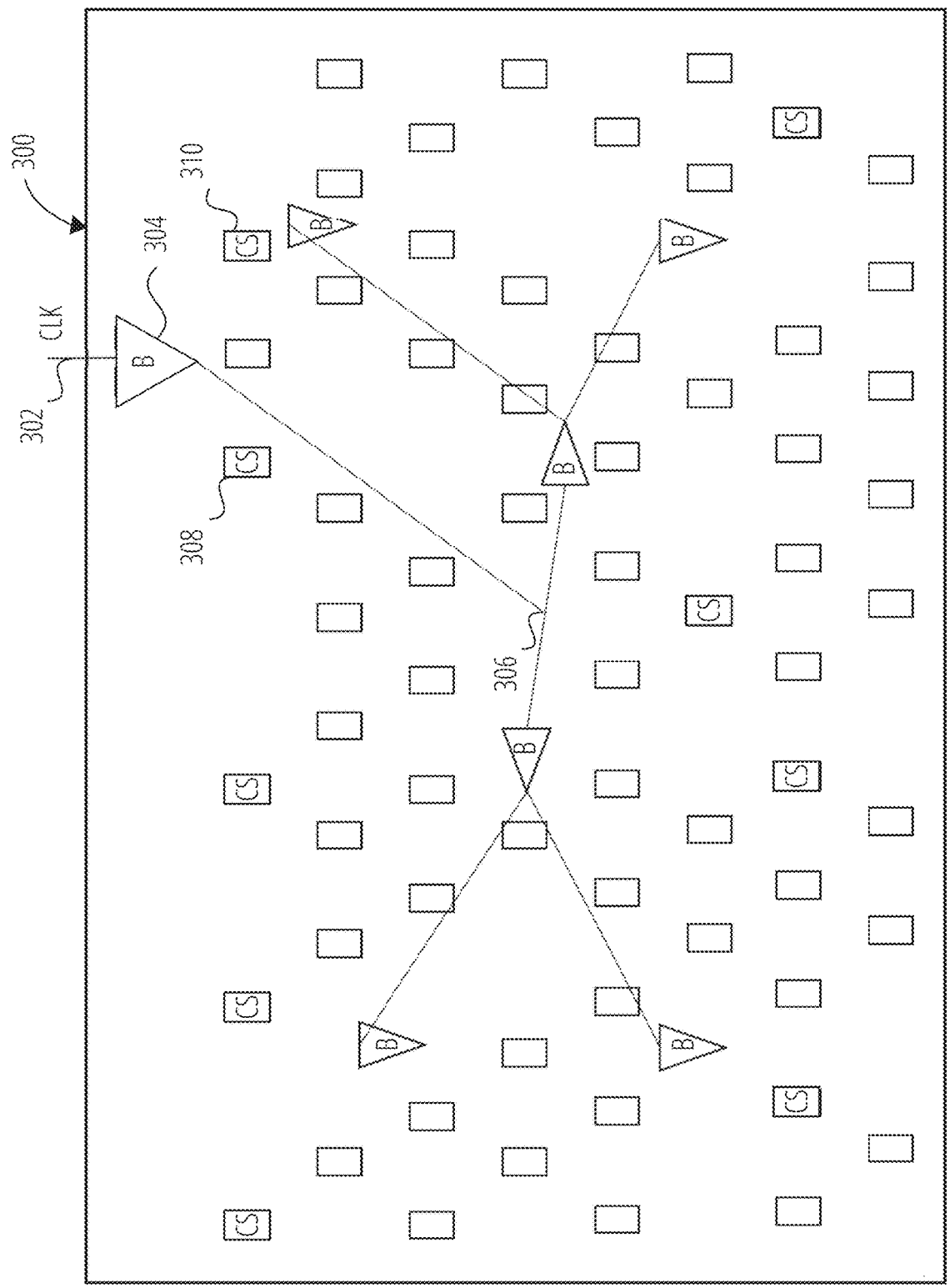
FIG. 3 is a plan view illustrating a simplified clock tree to which post-CTS clock tree modifications may be applied, in accordance with some embodiments of the present disclosure.

FIG. 3 is a floorplan or plan view 300 of a simplified buffered clock tree of an IC to which post-CTS clock tree modifications may be applied in accordance with some embodiments of the present disclosure. The plan view 300 illustrates that an input clock signal CLK applied on a root node 302 of the clock tree is first routed from the root node through a buffer 304 and toward a center 306 of the IC. The CLK signal is thereafter distributed outward from the center 306 to propagate the clock signal to clock sinks CS in the clock tree. This technique helps to better equalize the insertion delays ID of the clock sinks CS. If the CLK signal was to be routed directly from the root node 302 to clock sinks 308, 310, for example, the insertion delays ID of these two clock sinks could be much lower than the insertion delays of the remaining clock sinks CS in the clock. Large differences in insertion delays ID among clock sinks CS results in large skews SK among clock sinks in the clock tree, which is undesirable. Thus, as depicted in FIG. 3, the CLK signal is routed from the root node 302 and through the buffer 304 towards the center 306 of the IC, and from the center the clock signal is then routed to additional buffers B arranged in respective regions of the IC. Each of these additional buffers B will provide a propagated clock signal to clock sinks CS proximate the buffer B in the corresponding region of the IC.

Returning now to FIG. 1, according to various embodiments the clock tree reformulation, restructuring or modification is performed as a part of the CTS operation 108. The CTS operation 108 includes placing clock or drivers in various regions of the IC design based on satisfaction of a set of clock tree design rules or constraints, which can include slew, insertion delay (i.e., latency), skew, and power consumption by the generated clock tree. Each clock driver delivers the clock signal to a set of clock sinks and/or a further clock driver or set of clock drivers. A clock net of the IC design describes conductive traces or routes between a clock driver and clock sinks as well as any further clock drivers to be driven by the clock driver. Any one of the clock sources, clock sinks, and clock drivers may be referred to generally herein as a "clock instance." Moreover, clock drivers will typically be referred to as buffers in the following description by way of example of one common type of clock driver.

The CTS operation 108 constructs an initial clock tree through a suitable technique, such as, for example, using the Steiner-tree approach. With the Steiner-tree approach, a minimum rectilinear Steiner tree (MRST) is used for routing a multi-pin clock net with minimum length for conductive traces or routes connecting to the clock sinks CS. Given m points in the plane, an MRST connects all points by rectilinear lines, possibly via some extra points (called Steiner points), to achieve a minimum-length tree of rectilinear edges. One skilled in the art will understand the utilization of the Steiner-tree approach to formulate an initial clock tree, and the Steiner-tree approach will not be described in detail in the present description. In addition, one skilled in the art will appreciate that the Steiner-tree approach is merely one example of an approach that may be used to construct an initial clock tree. In other embodiments, the CTS operation 108 may utilize one of several other known clock tree construction techniques to construct the conductive routes connecting to the clock sinks CS in the initial clock tree.

As will be discussed further detail below with reference to FIG. 4, the CTS operation 108 performs additional operations as part of the CTS to further refine the structure of the initial clock tree until a complete clock tree has been generated. Traditionally, the complete clock tree structure would correspond to the finalized clock tree structure and no further changes to the complete clock tree were possible after generation through CTS. In embodiments of the present disclosure, the CTS operation 108 implements techniques for reducing the number of modifications to a post-CTS clock tree that are necessary for the post-CTS clock tree to satisfy specified insertion delay and skew parameters for the clock tree, as will be described in more detail below. More specifically, embodiments identify clock sinks in the post-CTS clock tree that must be adjusted or modified in a way that reduces the number of post-CTS modifications necessary for the clock tree to satisfy specified insertion delay and skew parameters for the clock tree. Details of the CTS operation 108 in identifying clock sinks CS to be modified according to embodiments of the present disclosure will be described below with reference to FIGS. 7-9.

In FIG. 1, after design inputs are used in the design input operation 104 to generate a circuit layout for the functional circuitry of the device being designed, and the routing and optimization operation 106 is performed, a layout is generated in the layout instance operation 110. The layout describes the physical layout dimensions of the device that match the design inputs. Prior to this layout being provided to a fabrication operation 114, the signoff operation 112 is performed on the circuit design defined by the layout.

After signoff verification by the signoff operation 112, a verified version of the layout is used in the fabrication operation 114 to generate a device, or additional testing and design updates may be performed using designer inputs or automated updates based on design simulation operations 116, or extraction, 3D modeling, and analysis operations 122. Once the device is generated, the device can be tested as part of device test operation 126, and layout modifications generated based on actual device performance.

A design update operation 118 from the design simulation operation 116, a design update operation 124 from the device test operation 126 or the extraction, 3D modeling, and analysis operations 122, or the design input operation 104 may occur after the initial layout instance operation 110 is performed. In various embodiments, whenever design inputs are used to update or change an aspect of a circuit design, a timing analysis and the routing and optimization operation 106 may be performed.

Figure 4:
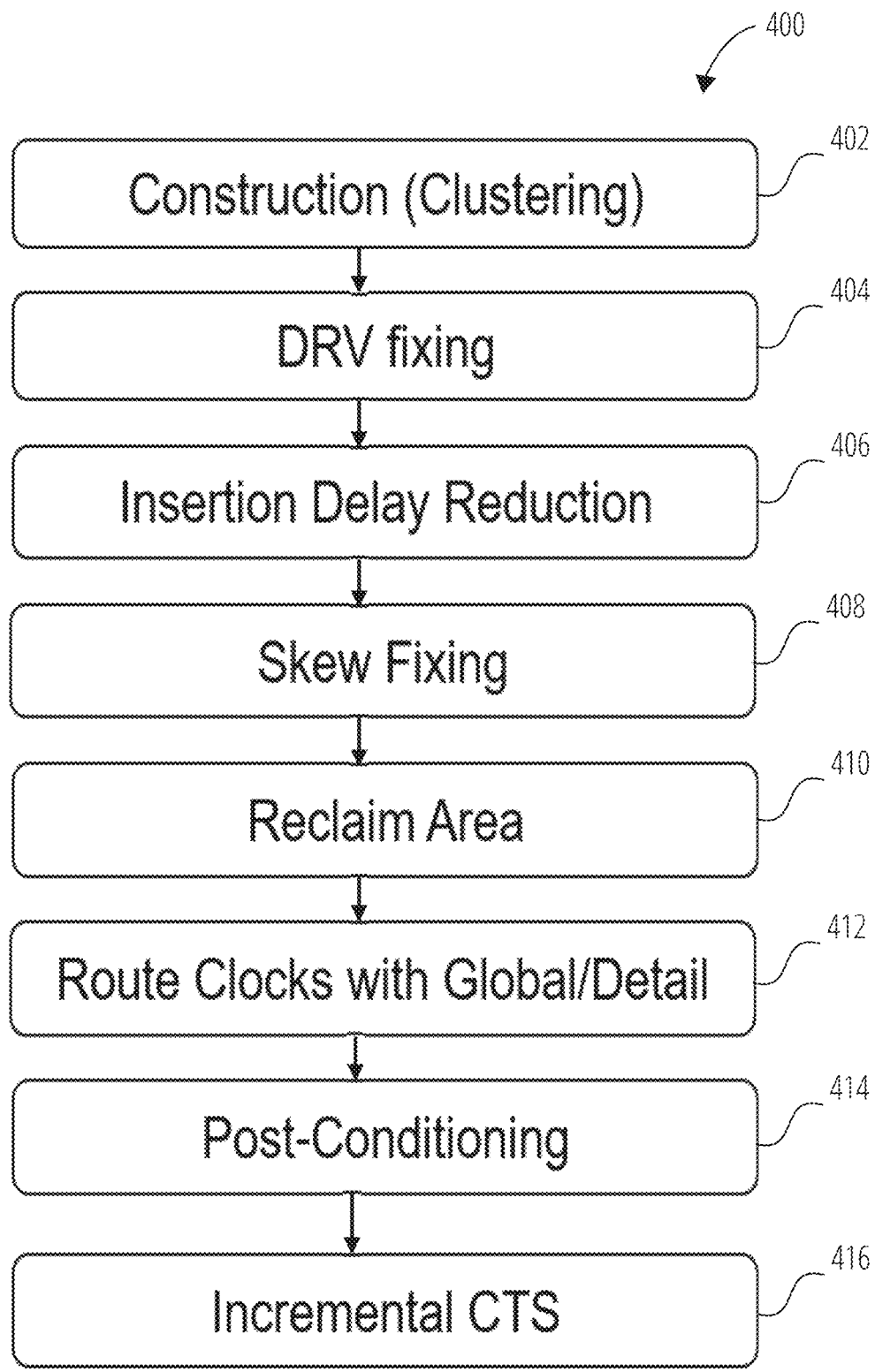
FIG. 4 is a flow diagram illustrating in more detail CTS and applying post-CTS clock tree modifications to a synthesized clock tree, in accordance with some embodiments of the present disclosure.

FIG. 4 is a flow diagram illustrating in more detail a CTS process flow 400 which includes operations 402-414 for performing CTS to generate a complete clock tree, and further includes an incremental CTS operation 416 for implementing post-CTS modifications to the complete clock tree to generate a finalized clock tree according to embodiments of the present disclosure. The operations 402-414 perform traditional operations in CTS and thus each of these operations will not be described in detail herein, with those skilled in the understanding the suitable techniques for performing each of these operations. The CTS process flow 400 starts the CTS in a construction (clustering) operation 402 in which clock sinks CS to be included in the clock tree are group or clustered based on some criteria, such as geometry-based K-means clustering or capacitance-based clustering. In the CTS process flow 400, the clustering operation 402 includes the formation of an initial clock tree through Steiner-routing or other suitable technique as described above with reference to the CTS operation 108 of FIG. 1.

The CTS process flow 400 further includes a design rule violation (DRV) operation 404 fixes violations of design rules for the clock tree that are present in the initial clock tree. Design rules are geometric constraints applied to a physical layout of an IC being designed to ensure the designed circuit functions properly, as will be appreciated by those skilled in the art. Typical design rules relate to width of conductive traces or routes, spacing between adjacent conductive routes, along with many other design rules which must be followed to ensure proper functionality of the designed circuit. An insertion delay reduction operation 406 reduces insertion delays ID of clock sinks the clock tree, such as by repositioning clock sinks closer to the root node to reduce insertion delay or adding drivers to increase insertion delay. A skew fixing operation 408 fixes skew violations of propagated signals in the clock tree being synthesized and an area reclamation operation 410 reduces the area occupied by the clock tree in the total layout area of the IC being designed.

A global and detailed routing operation 412 reroutes the initial conductive trace routing generated in the Steiner-tree routing performed by operation 402 with actual physically routing of conductive traces that may be used to connect to the clock sinks CS. For example, in the global routing portion of operation 412 the conductive routes generated through the Steiner-tree routing are physically positioned so that the conductive routes do not short circuit with one another. The detailed routing portion of operation 412 fine tunes the clock tree being synthesized, eliminating any design rule violations arising from the global routing and ensuring that the clock tree is physically synthesizable for the IC being designed. The fine tuning of the clock tree in the detailed routing portion of operation 412 may result in violations of required operating parameters of the clock tree. For example, repositioning of selected conductive routes during detailed routing may change the capacitance of some of these conductive routes and this change in capacitance may result in transition time or slew violations for the propagated clock signal on these conductive routes. A post-conditioning operation 414 fixes slew violations that arise as a result of the detailed routing portion of the operation 412.

The CTS process flow 400 concludes with an incremental CTS operation 416 in which post-CTS modifications are performed on the synthesized clock tree generated after the post-conditioning operation 414 according to embodiments of the present disclosure. As mentioned above, traditionally no further changes to the synthesized clock tree that is generated after the post-conditioning operation 414 were possible without again performing clock synthesis. Moreover, performing clock tree synthesis on an EDA software system is a time-consuming process, typically taking hours to rerun or have the system again perform clock tree synthesis to modify the generated clock tree. In operation of the CTS process flow 400, the incremental CTS operation 416 provides, without once again performing clock tree synthesis and without requiring designer input, an automatic restructuring or modifying of a post-CTS clock tree to eliminate violations of specified insertion delay ID and skew parameters for the post-CTS clock tree, as will now be described in more detail with reference to FIGS. 5A-7. The incremental CTS operation 416 also reduces the number of post-CTS physical modifications to the synthesized clock tree, which is desirable as previously discussed. This makes it more likely the incremental CTS operation 416 is able to generate a finalized clock tree satisfying all required parameters for the clock tree and enabling implementation of the modified clock tree in the IC being designed.

Figure 5A:
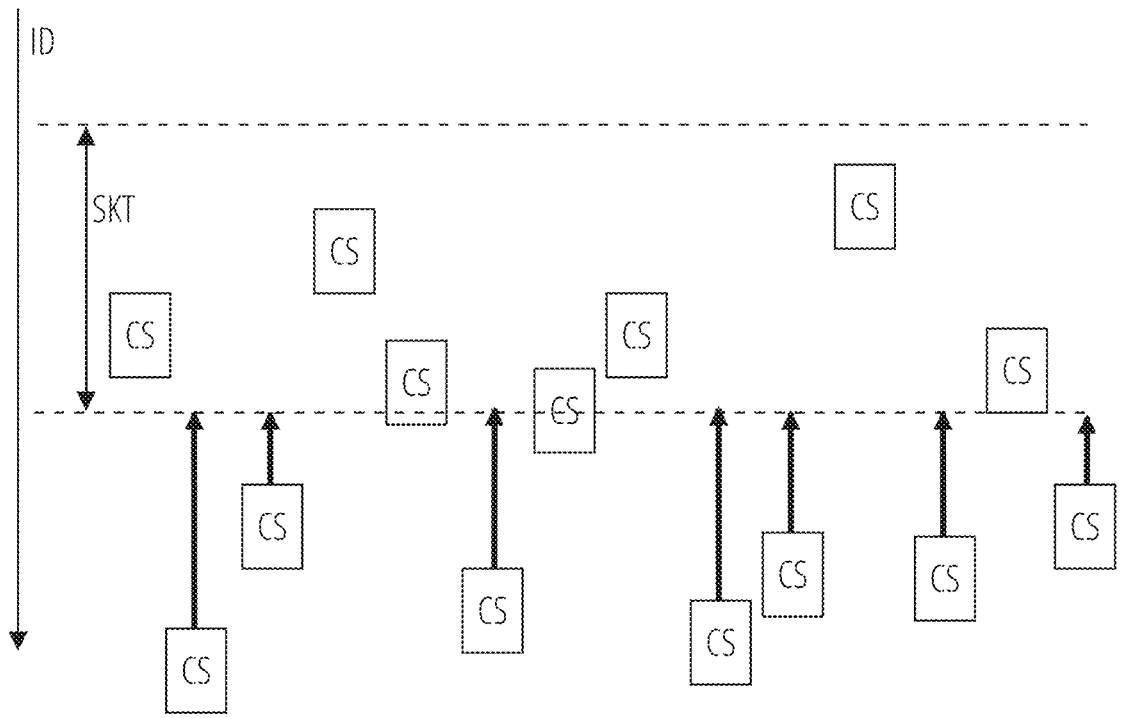
FIG. 5A illustrates an example of physical modifications to a post-CTS clock tree and shows difficulties that can arise in making physical modifications to clock sinks in the clock tree.

FIG. 5A illustrates an example of physical modifications to a post-CTS clock tree and difficulties that can arise in making such physical modifications. A plurality of clock sinks CS are shown along with a skew target SKT for the clock sinks. In this example, a relatively large number of clock sinks CS need to be restructured to satisfy the specified skew target SKT for the clock tree. This restructuring is represented through the upward arrows in FIG. 5A, indicating that the each of the associated clock sinks CS needs to be restructured to reduce the insertion delay ID of the clock sink so that the clock sink satisfies the skew target SKT. Restructuring clock sinks CS in a post-CTS clock tree is difficult as any changes made to a particular clock sink may result in unwanted changes to neighboring clock sinks. This is particularly true in situation like that illustrated in FIG. 5A in which a significant number of clock sinks CS need to be moved "upward" in the clock tree, namely need to be repositioned to reduce the insertion delay ID of these clock sinks so that the satisfy the specified skew target SKT for the clock tree. Reducing insertion delay ID of a clock sink CS is more difficult than increasing insertion delay, which may more easily be accomplished by, for example, including additional buffers or inverters in the path of the propagating clock signal for clock sink.

Figure 5B:
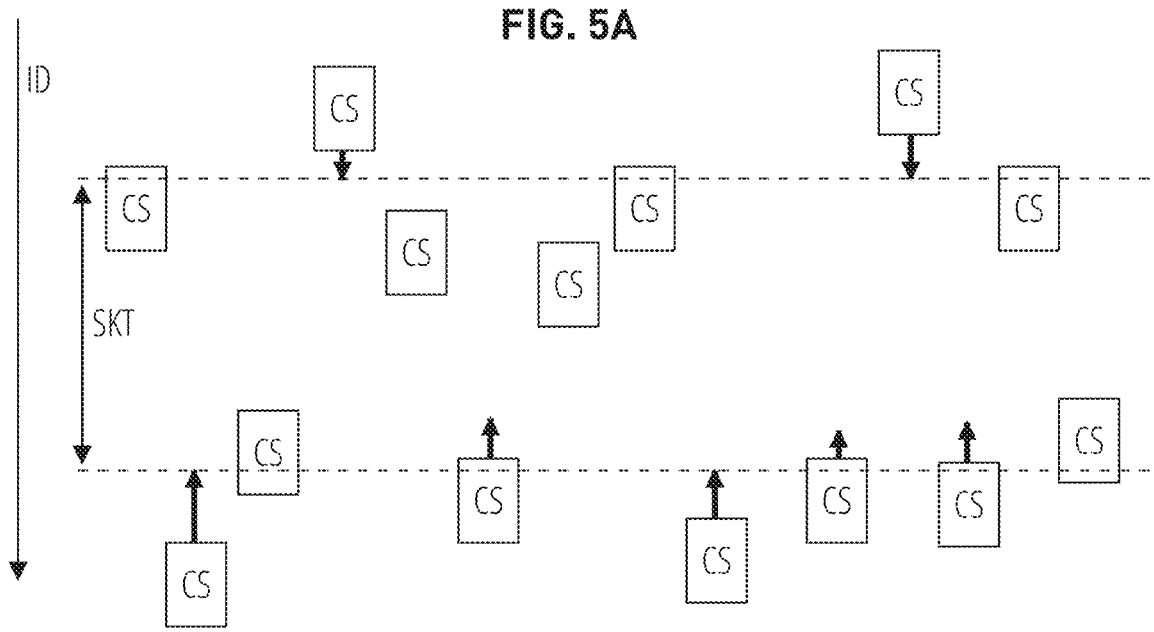
FIG. 5B illustrates another example of post-CTS clock tree physical modifications to a clock tree.

FIG. 5B illustrates another example of post-CTS clock tree physical modifications to a clock tree. Once again, a plurality of clock sinks CS are shown along with a skew target SKT for the clock sinks. In this example, two clock sinks CS need to be restructured to increase their respective insertion delays ID, as illustrated by the downward arrows for the two topmost clock sinks CS. In addition, the five bottom most clock sinks CS need to be restructured to decrease their respective insertion delays ID, as illustrated by the upward arrows for each of these bottom most clock sinks. While the scenario of FIG. 5B presents an easier restructuring or modifying scenario than the situation of FIG. 5A, a relatively large number of clock sinks CS still need to be repositioned in the example of FIG. 5B. Embodiments of the present disclosure automatically generates a target insertion delay for the plurality of clock sinks CS as well as automatically generating target insertion delay adjustments for selected clock sinks. This approach reduces the number of clock sinks CS that must be modified to meet specified insertion delay ID and skew target SKT parameters for the clock tree, as will now be described in more detail with reference to FIGS. 6 and 7.

Figure 6:
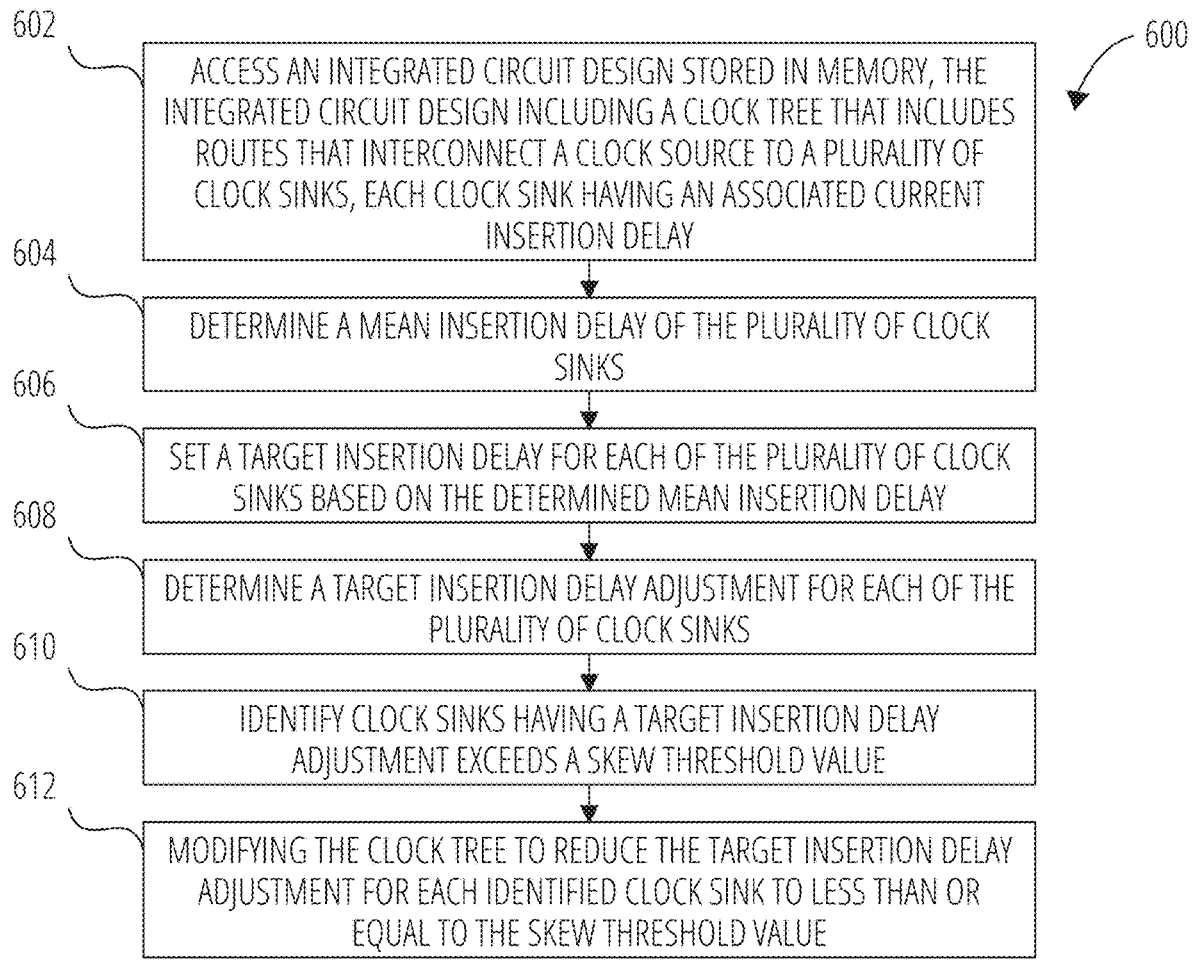
FIG. 6 illustrates a process for reformulating or modifying a post-CTS clock tree, in accordance with some embodiments of the present disclosure.

FIG. 6 illustrates a process 600 for reformulating or modifying a post-CTS clock tree according to some embodiments of the present disclosure. The process 600 begins with operation 602 in which an integrated circuit design stored in memory is accessed. This integrated circuit design includes a synthesized clock tree that has been generated through CTS, as described above with reference to FIG. 4. The clock tree includes a plurality of conductive traces or routes that interconnect a clock source or root node of the clock tree to a plurality of clock sinks CS. Each of the clock sinks CS as an associated insertion delay ID. After accessing the post-CTS clock tree in operation 602, a mean insertion delay MID of all of the plurality of clock sinks CS in the clock tree is determined in operation 604 of the process 600. The mean insertion delay MID is the average of the insertion delays ID of all the clock sinks CS in the post-CTS clock tree. The process 600 thereafter moves on to operation 606 and determines or sets a target insertion delay TID having a value that is based on the determined mean insertion delay MID. In one embodiment, the target insertion delay TID for the plurality of clock sinks CS in the post-CTS clock tree is set equal to the determined mean insertion delay MID (TID=MID). In this way, the process 600 automatically generates a value for the target insertion delay TID for all the clock sinks CS in the post-CTS clock tree. No user or designer input is needed for determining the target insertion delay TID in this embodiment.

After determining the target insertion delay TID for the plurality of clock sinks CS in operation 606, the process 600 proceeds to operation 608 and determines a target insertion delay adjustment TIDADJ for each of the plurality of clock sinks CS of the post-CTS clock tree. In one embodiment, the target insertion delay adjustment TIDADJ of each clock sink CS in the post-CTS clock tree is set equal to the difference between the current insertion delay CID of the clock sink and the determined target insertion delay TID for all of the clock sinks in the clock tree. Thus, in one embodiment the target insertion delay adjustment TIDADJ=(CID-TID) for each clock sink CS in the post-CTS clock tree. The corresponding target insertion delay adjustment TIDADJ for each of the plurality of clock sinks CS in the post-CTS clock tree is determined in this way in the operation 608. The determined target insertion delay adjustments TIDADJ for each of the clock sinks CS in the clock tree are saved in memory for use in subsequent operations of the process 600.

Once a target insertion delay adjustment TIDADJ has been determined for each of the plurality of clock sinks CS, the process 600 proceeds to operation 610. In operation 610, the process 600 identifies each clock sink CS in the plurality of clock sinks CS in the post-CTS clock tree having a target insertion delay adjustment TIDADJ with a magnitude that exceeds a skew threshold value SKTH. The operation 610 uses the magnitude or absolute value of the determined target insertion delay adjustment TIDADJ for each clock sink CS in making this identification. In this way, the process 600 automatically identifies clock sinks CS in the post-CTS clock tree that require restructuring or modification in order for the final clock tree to satisfy a specified skew target SKT for the clock tree. Finally, after operation 610 the process 600 proceeds to operation 612 and modifies the post-CTS clock tree to reduce the magnitude target insertion delay adjustment TIDADJ for each identified clock sink CS to less than or equal to the skew threshold value SKTH. The process 600 may be executed multiple times on a post-CTS clock tree, iteratively modifying the clock tree until the specified skew target SKT for the clock sinks CS is satisfied.

In some embodiments of the process 600, modifying the clock tree includes, for at least some of the identified clock sinks CS, moving the identified clock sink up or down in the post-CTS clock tree to a thereby move the identified clock sink to a new position in the clock tree. The new position of the identified clock sink CS modifies or adjusts the current insertion delay CID of the identified clock sink, reducing the magnitude of the target insertion delay adjustment TIDADJ of the identified clock sink so that this magnitude is less than or equal to the skew threshold value SKTH. In some embodiments of the process 600, modifying the post-CTS clock tree further includes, for each of the identified clock sinks CS, adjusting at least one of a position or a sizing of neighboring clock instances in the clock tree to accommodate the new position of the identified clock sink. In modifying the position of identified clock sinks CS in the post-CTS clock tree to adjust the current insertion delay CID of these clock sinks and thereby being the skew of these clock sinks within the skew target SKT for the clock tree, some restructuring or modification of adjacent or neighboring clock sinks CS may also be required.

When the target insertion delay adjustment TIDADJ of each identified clock sink CS in the post-CTS clock tree is less than or equal to the skew threshold value SKTH, this means the current insertion delays CID of these identified clock sinks have values that place the skew of these identified clock sinks within the skew target SKT for the clock tree. In one embodiment of the process 600, the skew threshold value SKTH is equal to one-half of the skew target SKT for the plurality of clock sinks in the post-CTS clock tree (SKTH=½ SKT). In another embodiment of the process 600, the process further includes calculating a standard deviation SD of the current insertion delays CID of the plurality of clock sinks CS in the post-CTS clock tree. The process 600 then includes setting the skew threshold value SKTH to be equal to twice the standard deviation SD when twice the standard deviation is less than one-half the skew target value SKT for the plurality of clock sinks CS in the post-CTS clock tree. This approach is advantageous where the vast majority (i.e., two standard deviations or approximately 95% of the clock sinks CS in the post-CTS clock tree) of the clock sinks CS have current insertion delays CID result in the 2SD of these current insertion delays corresponding to a skew that is less than the specified skew target SKT for the clock tree. The identified clock sinks CS will in this situation have their current insertion delays CID modified such that these clock sinks also fall within this tighter skew target SKT defined by the 2SD value for the vast majority of clock sinks CS in the post-CTS clock tree.

Figure 7A:
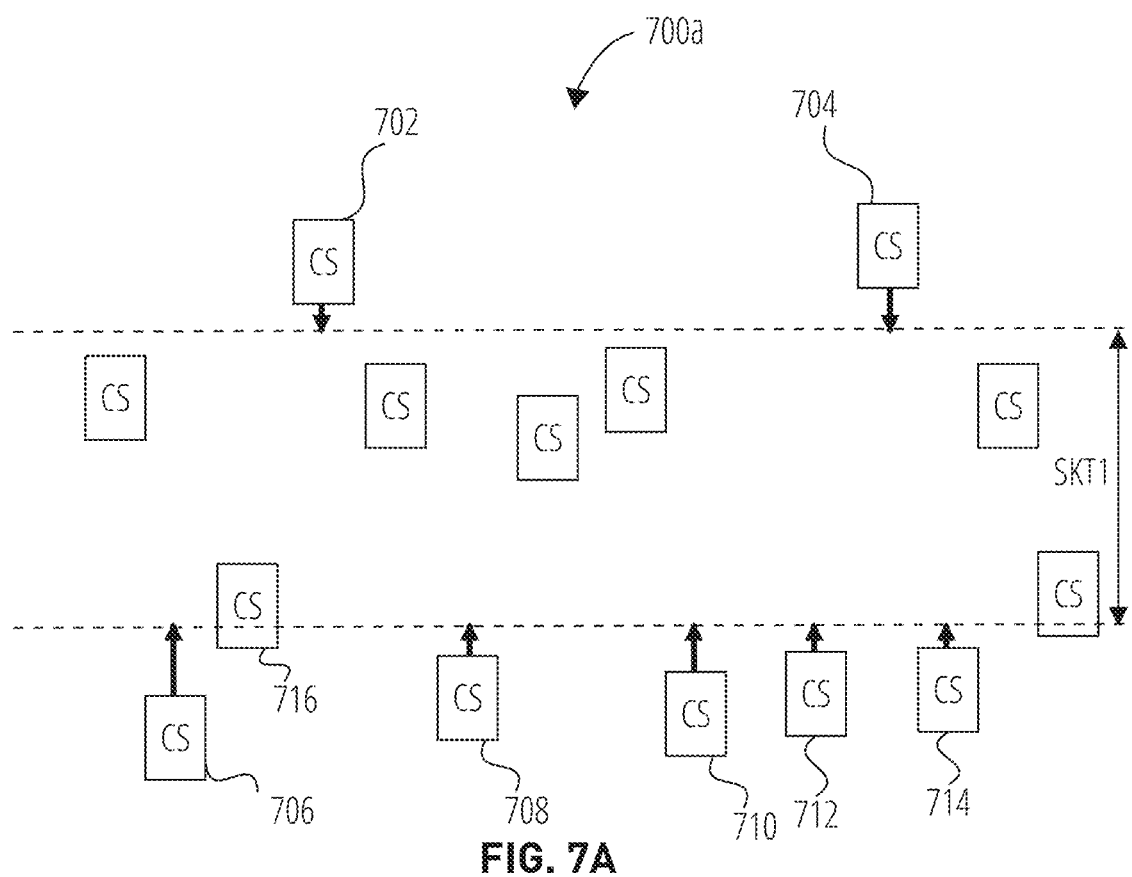
FIGS. 7A and 7B illustrate the operation of the process of FIG. 6 in performing post-CTS modification of the clock tree, in accordance with some embodiments of the present disclosure.

The operation of the process 600 in modifying a post-CTS clock tree 700 to satisfy the specified skew target SKT for the clock tree will now be described in more detail with reference to FIGS. 7A and 7B. FIG. 7A shows the post-CTS clock tree 700a includes a number of clock sinks CS that fall outside an initial skew target SKT1 for the clock tree. Many of the clock sinks CS in the post-CTS clock tree 700a fall within the initial skew target SKT1. A number of the clock sinks CS, however, have respective insertion delays ID that result in these clock sinks falling outside the initial skew target SKT1. Each such clock sink CS is labeled with an upward or downward arrow in FIG. 7A and is also labeled with a respective reference number 702-714. Thus, each of the clock sinks 702-714 falls outside the skew target SKT1 for the post-CTS clock tree 700, meaning the skew of these clock sinks is outside the desired range of skews for the lock tree.

In modifying the post-CTS clock tree 700a, the process 600 calculates the mean insertion delay MID of all the clock sinks CS in the post-CTS clock tree. As previously described, the process 600 sets the target insertion delay TID for the clock sinks CS in the post-CTS clock tree 700a based on the determined mean insertion delay MID of all the clock sinks. In one embodiment, the process 600 sets the target insertion delay TID equal to the determined mean insertion delay MID. The process 600 then determines the target insertion delay adjustment TIDADJ for each of the clock sinks CS in the post-CTS clock tree 700a, where in one embodiment the target insertion delay adjustment for each clock sink CS is the magnitude of the difference between the current insertion delay CID of the clock sink and the target insertion delay TID. Clock sinks CS having a magnitude of the target insertion delay adjustment TIDADJ exceeding a skew threshold value SKTH are then identified. The skew threshold value SKTH effectively defines a new skew target STK2 around the target insertion delay TID, as illustrated in FIG. 7B. In some embodiments, the skew threshold value SKTH is equal to one half of the new skew target SKT2 (i.e., SKTH=½ SKT2). The process 600 identifies any clock sinks CS for which the magnitude of the corresponding target insertion delay adjustment TIDADJ exceeds the skew threshold value SKTH (i.e., TIDADJ>SKTH). The identified clock sinks CS are the clock sinks in the post-CTS clock tree 700 requiring modification or restructuring.

Figure 7B:
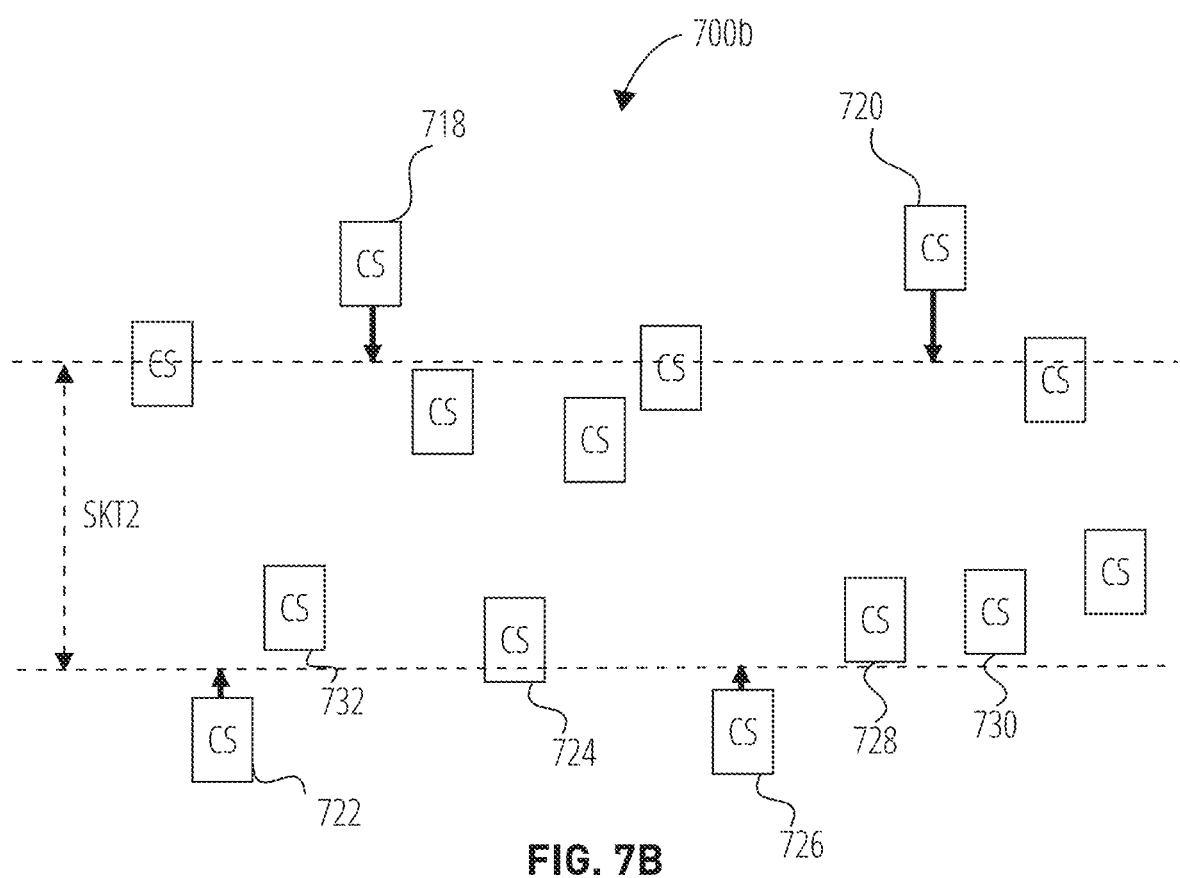

The example of FIG. 7B illustrates how the process 600 may reduce the number of clock sinks CS requiring modification in the post-CTS clock tree, which is advantageous as previously described. Clock sinks 718-732 in clock tree 700b of FIG. 7B correspond to clock sinks 702-716 in FIG. 7A. For example, the clock sink 732 in the post-CTS clock tree 700b has a target insertion delay adjustment TIDADJ with a magnitude that is less than the skew threshold SKTH and so this clock sink needs no adjustment or modification. The clock sink 732 similarly would not have required modification in the post-CTS clock having the initial skew target SKT1 of FIG. 7A. In the process 600, however, some clock sinks CS initially falling outside the initial skew target SKT1 need not be reformulated or modified in the post-CTS clock tree 700b of FIG. 7B. The clock sink 724, for example, would initially have required modification to satisfy the initial skew target SKT1 as seen in FIG. 7A. With the new target insertion delay TID for the clock tree 700b, however, the magnitude of the target insertion delay adjustment TID-ADJ of the clock sink 724 is less than skew threshold value SKTH. Thus, the clock sink 724 need not be restructured or modified in the reformulation process 600. This is true for other clock sinks CS in the post-CTS clock tree 700b as well. The clock sinks 728 and 730, which would have initially required modification in the post-CTS clock tree 700a to satisfy the initial skew target SKT1, no longer need to be modified in the process 600. The magnitudes of the target insertion delay adjustments TIDADJ of the clock sinks 728, 730, although not illustrated in FIG. 7B, have magnitudes less than the skew threshold SKTH.

FIGS. 7A and 7B illustrate that the process 600 according to some embodiments of the present disclosure reduces the number of clock sinks CS requiring modification in the post-CTS clock tree 700b. This is advantageous as described above since any modifications to a respective clock sink CS in the post-CTS clock tree 700b will affect neighboring clock sinks. In the example of FIG. 7A, initially clock sinks 702-714 would have required modification in the post-CTS clock tree 700a. This is a total of seven clock sinks 702-714 requiring modification. In the process 600, the clock sinks 724, 728, 7380, which correspond to clock sinks 708, 712 and 714 of FIG. 7A, no longer require modification. The total number of clock sinks CS requiring modification is accordingly reduced by three in the simplified example of FIG. 7B. Only a total of four clock sinks 718, 720, 722 and 726 require modification when the process 600 is applied to modify the post-CTS clock tree 700b. In contrast, the post-CTS clock tree 700a would have required modification of seven total clock sinks 702-714 to satisfy the initial skew target SKT1.

Embodiments of the present disclosure including the process 600 of FIG. 6 reduce changes that must be made to a post-CTS clock tree while also automatically identifying clock sinks CS within the post-CTS clock tree requiring modification. Reducing the number of clock sinks CS requiring modification reduces disruptions, such as design rule violations, which may result when modifying clock sinks in a post-CTS clock tree. Adjusting the target insertion delay TID in the process 600, as seen in FIGS. 7A, 7B, effectively shifts the skew target SKT for the clock sinks CS in the post-CTS clock tree such that more of the clock sinks fall within the new skew target SKT2. As a result, fewer clock sinks CS in the post-CTS clock tree require modification. Clock sinks CS requiring modification necessitate physical modifications or restructuring of the post-CTS clock tree, and reducing the required number of physical modifications increases the likelihood the post-CTS clock tree may be successfully modified to meet the specified skew target for the clock tree. The process 600 and other embodiments of the present disclosure may increase the mean insertion delay ID of the clock sinks CS in the modified post-CTS clock tree. While this is true, increases in insertion delay ID of clock sinks CS in a clock tree for an IC being designed are more easily accommodated than are clock sinks having a skew that is outside the specified skew target, as will be understood by those skilled in the art.

Figure 8:
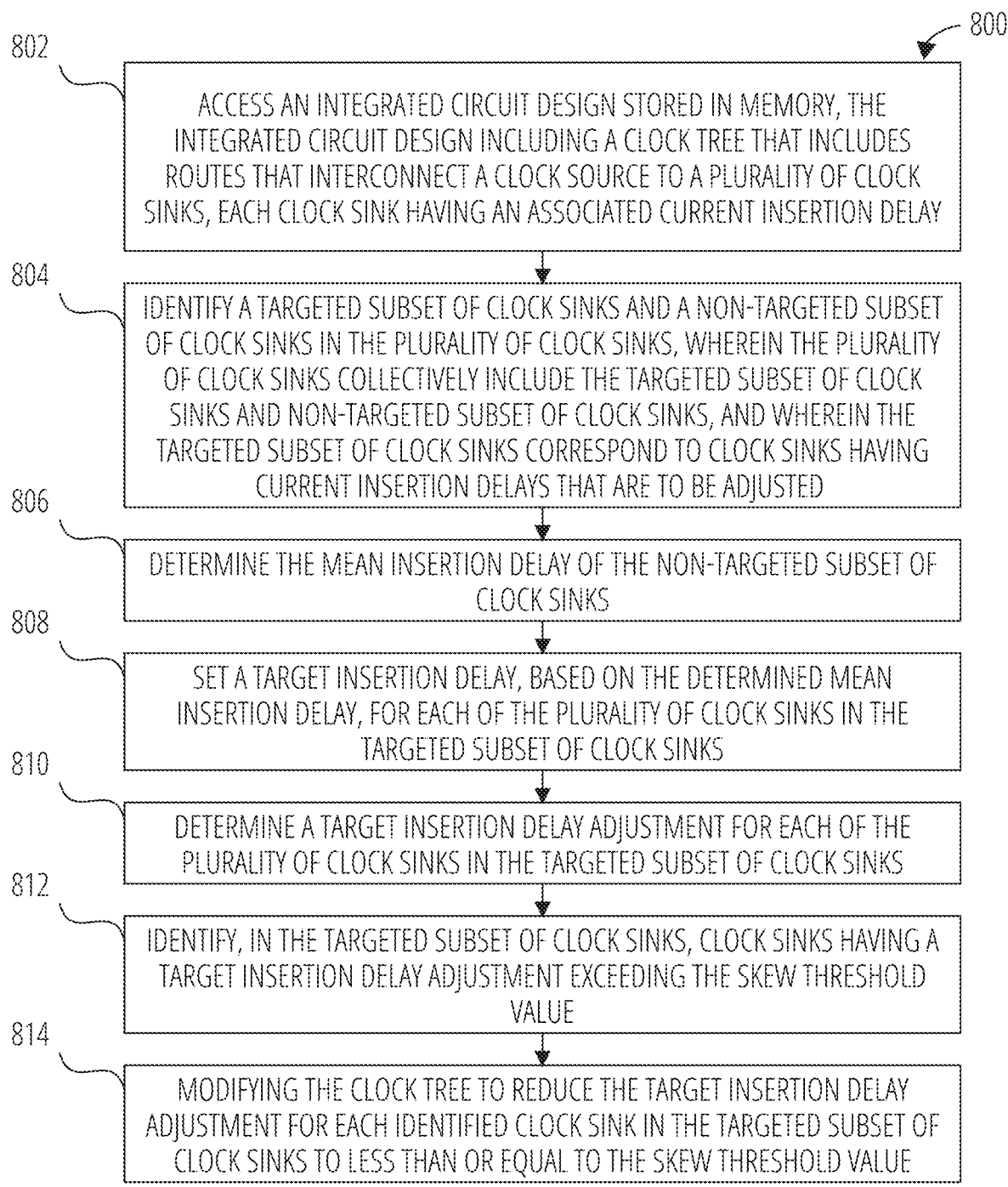
FIG. 8 illustrates another process of for performing post-CTS modification or reformulation of a clock tree, in accordance with some embodiments of the present disclosure.

FIG. 8 illustrates another process 800 for performing modification or reformulation of a post-CTS clock tree according to some embodiments of the present disclosure. The process 800 is directed to embodiments where a designer of an IC including the post-CTS clock tree has identified or would like to identify the clock sinks CS in the post-CTS clock tree that are to be restructured or modified. For example, a designer may have identified a particular subset of all the clock sinks CS for which the designer particularly cares about the skew of the clock sinks in this particular subset relative to the mean insertion delay MID of all clock sinks CS in the post-CTS clock tree. The process 800 enables designers to perform post-CTS modifications to a clock tree in this situation.

The process 800 starts in an operation 802 in which the process accesses an integrated circuit design stored in memory, the integrated circuit design including a clock tree that includes conductive traces or routes that interconnect a clock source to a plurality of clock sinks CS. Each of the clock sinks CS has an associated current insertion delay CID. From operation 802 the process 800 goes to operation 804 and identifies a targeted subset of clock sinks CS and a non-targeted subset of clock sinks CS in the plurality of clock sinks CS contained in the post-CTS clock tree to be modified. The plurality of clock sinks CS collectively include the targeted subset of clock sinks and non-targeted subset of clock sinks. The targeted subset of clock sinks CS correspond to clock sinks having current insertion delays CID that are to be modified. After identifying the targeted and non-targeted subset of clock sinks CS at operation 804, the process 800 goes to operation 806 and determines the mean insertion delay MID of the non-targeted subset of clock sinks. Identifying the targeted subset of clock sinks CS may include receiving a user request identifying the target subset to be utilized in the process 800.

After the operation 806, the process 800 proceeds to the operation 808 and sets the target insertion delay TID of the targeted subset of clock sinks CS based on the determined mean insertion delay MID of the clock sinks in the non-targeted group of clock sinks CS. From operation 808, the process 800 proceeds to operation 810 and determines a target insertion delay adjustment TIDADJ for each of the plurality of clock sinks CS in the targeted subset of clock sinks. The process 800 then proceeds to operation 812 and identifies clock sinks CS in the targeted subset of clock sinks that have a target insertion delay adjustment TIDADJ exceeding a skew threshold value SKTH. From the operation 812, the process 800 proceeds to operation 714 and modifies the post-CTS clock tree to reduce the target insertion delay adjustment TIDADJ for each identified clock sink CS in the targeted subset of clock sinks to less than or equal to the skew threshold value SKTH. As with the process 600 previously described with reference to FIG. 6, the process 800 is repeated as required, with the operations 802 through 814 being iteratively executed to repeatedly modify the post-CTS clock tree until the identified clock sinks CS in the targeted subset of clock sinks satisfy the specified SKU threshold value SKTH.

The current insertion delays CID of the clock sinks CS in the targeted subset of clock sinks are not utilized in determining the mean insertion delay MID in the process 800. Utilizing only the non-targeted subset of clock sinks CS enables the process 800 to converge more quickly on a satisfactory modified post-CTS clock tree. This is true because calculating the mean insertion delay MID in this way keeps the target insertion delay TID, which is based on the mean insertion delay, stable across iterations of the process 800 as the process is iteratively executed to generate the modified post-CTS clock tree. If the current insertion delays CID of the clock sinks CS contained in the targeted subset were included in generating the target insertion delay TID, then after modifications to these clock sinks in the targeted subset the mean insertion delay MID and thus the targeted insertion delay TID could vary across iterative operations of the process 800. This would occur, for example, where all of the clock sinks CS contained in the targeted subset are moved in one direction (i.e., either all current insertion delays CID for these targeted clock sinks CS are increased or all our decreased). In this situation, the modified post-CTS clock tree would have a different mean insertion delay MID and target insertion delay TID. This changing target insertion delay TID across iterations of the process 800 would make it more difficult for the process to converge on a satisfactory modified post-CTS clock tree.

The processes 600 and 800 may be performed as part of a post-CTS clock tree modification process applied to a circuit design (e.g., a circuit design of an EDA software system) in some embodiments of the present disclosure. Furthermore, it will be understood that the processes 600 and 800, and other processes described above in relation to these embodiments, may be performed by a device, such as a computing device executing instructions of an EDA software system. For instance, the operations of the processes 600, 800 may be represented by executable instructions (e.g., EDA software) that, when executed by a processor of a computing device, cause the computing device to perform the methods or processes 600 and 800 and other processes described above. Thus, operation of the processes 600, 800 may be performed or executed on a hardware processor (e.g., central processing unit or graphics processing unit) of a computing device (e.g., desktop, server, etc.).

Figure 9:
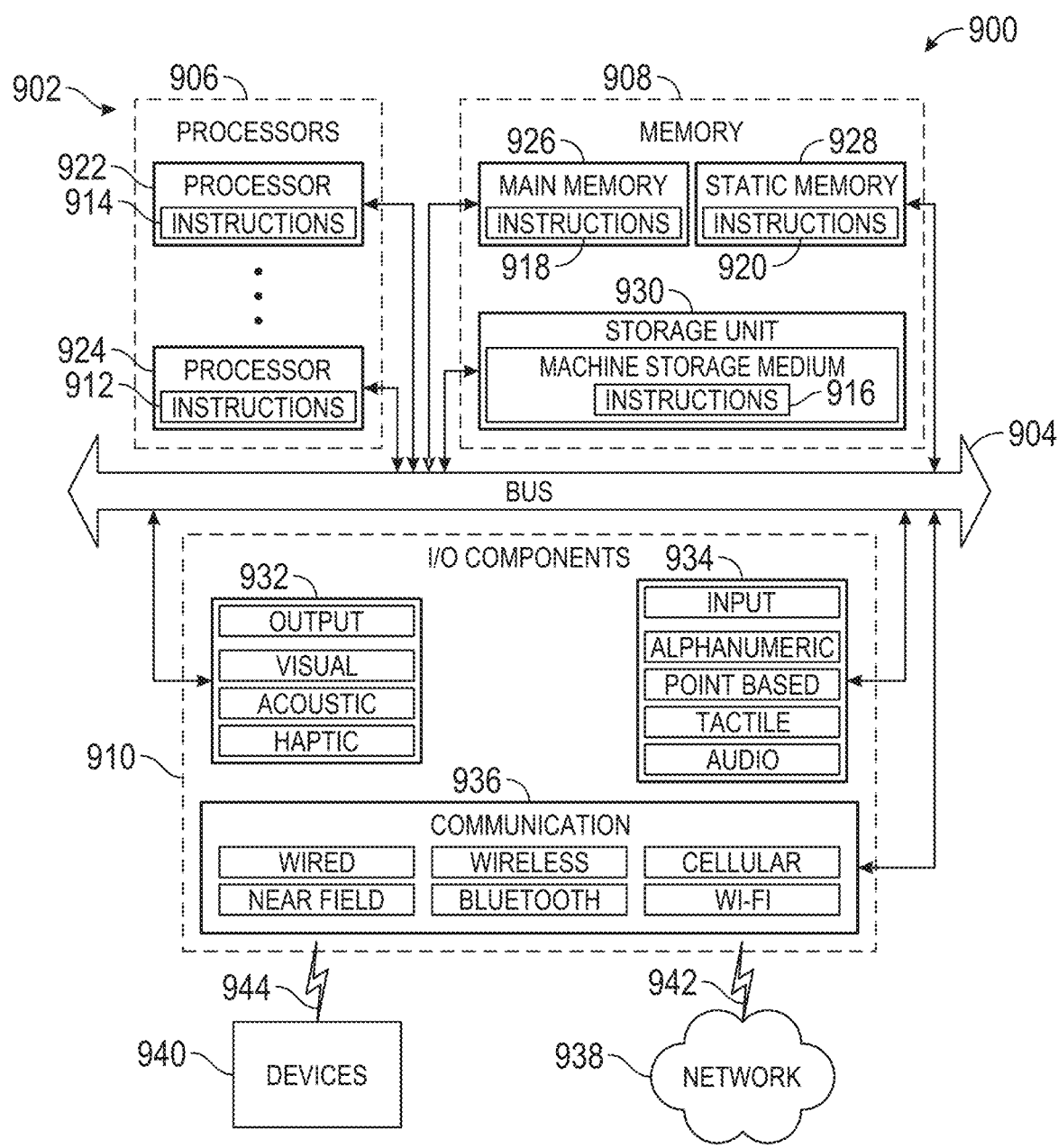
FIG. 9 is a functional block diagram of a computing system for carrying out methods and operations described herein, in accordance with some embodiments of the present disclosure.

FIG. 9 is a functional block diagram of a computing system 900 for executing processes 600, 800 and other processes described above, along with other embodiments of the present disclosure. The computing system 900 may execute an EDA software system and for performing the processes 600, 800, and other processes described above, in accordance with some embodiments of the present disclosure. A machine 902 is shown in the form of a computer system within which a set of instructions may be executed for causing the machine to perform any one or more of the processes 600, 800 and other methodologies discussed herein, according to some embodiments. Specifically, FIG. 9 shows a diagrammatic representation of the machine 902 in the example form of a computer system. The machine 902 may include a bus 904, processors 906, memory 908, and I/O components 910, which may be configured to communicate with each other such as via the bus. The machine 902 may include instructions 912-920 (e.g., software, a program, an application, an applet, an app, or other executable code) for causing the machine 902 to perform any one or more of the methodologies discussed herein may be executed. For example, the instructions 912-920 may cause the machine 902 to execute an EDA software system that executes the processes of FIGS. 4, 6, 8 and other processes described in the above description. The instructions 912-920 transform the general, non-programmed machine 902 into a particular machine 902 programmed to carry out the described and illustrated functions in the manner described here. In alternative embodiments, the machine 902 operates as a standalone device or may be coupled (e.g., networked) to other machines. In a networked deployment, the machine 902 may operate in the capacity of a server machine or a client machine in a server-client network environment, or as a peer machine in a peer-to-peer (or distributed) network environment. The machine 902 may comprise, but not be limited to, a server computer, a client computer, a personal computer (PC), a tablet computer, a laptop computer, a netbook, a smart phone, a mobile device, a), a network router, a network switch, a network bridge, or any machine capable of executing the instructions 912-920, sequentially or otherwise, that specify actions to be taken by the machine 902. Further, while only a single machine 902 is illustrated, the term "machine" shall also be taken to include a collection of machines 902 that individually or jointly execute the instructions 912-920 to perform any one or more of the methodologies discussed herein.

In an example embodiment, the processors 906 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 922 and a processor 924 that may execute the instructions 914, 912. The term "processor" is intended to include multi-core processors 906 that may comprise two or more independent processors (sometimes referred to as "cores") that may execute instructions contemporaneously. Although FIG. 9 shows multiple processors 906, the machine 902 may include a single processor with a single core, a single processor with multiple cores (e.g., a multi-core processor), multiple processors with a single core, multiple processors with multiple cores, or any combination thereof.

The memory 908 may include a main memory 926, a static memory 928, and a storage unit 930, both accessible to the processors 906 such as via the bus 904. The main memory 926, the static memory 928, and the storage unit 930 store the instructions 916-920 embodying any one or more of the processes, methodologies or functions described herein. The instructions 912-920 may also reside, completely or partially, within the main memory 926, within the static memory 928, within the storage unit 920, within at least one of the processors 906 (e.g., within the processor's cache memory), or any suitable combination thereof, during execution thereof by the machine 902.

The I/O components 910 may include a wide variety of components to receive input, provide output, produce output, transmit information, exchange information, capture measurements, and so on. The specific I/O components 910 that are included in a particular machine will depend on the type of machine. For example, portable machines such as mobile phones will likely include a touch input device or other such input mechanisms, while a headless server machine will likely not include such a touch input device. It will be appreciated that the I/O components 910 may include many other components that are not shown in FIG. 9. The I/O components 910 are grouped according to functionality merely for simplifying the following discussion and the grouping is in no way limiting. In various example embodiments, the I/O components 910 may include output components 932 and input components 934. The output components 932 may include visual components (e.g., a display such as a plasma display panel (PDP), a light emitting diode (LED) display, a liquid crystal display (LCD), a projector, or a cathode ray tube (CRT)), acoustic components (e.g., speakers), other signal generators, and so forth. The input components 934 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The I/O components 910 may include communication components 936 operable to couple the machine 902 to a network 938 or devices 940 via a coupling 942 and a coupling 944, respectively. For example, the communication components 936 may include a network interface component or another suitable device to interface with the network 938. In further examples, the communication components 936 may include wired communication components, wireless communication components, cellular communication components, and other communication components to provide communication via other modalities. The devices 940 may be another machine or any of a wide variety of peripheral devices (e.g., a peripheral device coupled via a universal serial bus (USB)).

Executable Instructions and Machine Storage Medium

The various memories (e.g., 908, 918, 920 and/or memory of the processor(s) 906, 922, 924) and/or the storage unit 930 may store one or more sets of instructions and data structures (e.g., software) embodying or utilized by any one or more of the methodologies or functions described herein. These instructions, when executed by the processor(s) 906, cause various operations to implement the disclosed embodiments.

As used herein, the terms "machine-storage medium," "device-storage medium," and "non-transitory computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Transmission Medium

In various example embodiments, one or more portions of the network 938 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 938 or a portion of the network 938 may include a wireless or cellular network, and the coupling 942 may be a Code Division Multiple Access (CDMA) connection, a Global System for Mobile communications (GSM) connection, or another type of cellular or wireless coupling. In this example, the coupling 942 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 912-920 may be transmitted or received over the network 938 using a transmission medium via a network interface device (e.g., a network interface component included in the communication components 936) and utilizing any one of a number of well-known transfer protocols (e.g., hypertext transfer protocol (HTTP)). Similarly, the instructions 912-920 may be transmitted or received using a transmission medium via the coupling 944 (e.g., a peer-to-peer coupling) to the devices 940. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 912-920 for execution by the machine 902, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

Computer-Readable Medium

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor implemented. For example, at least some of the operations of a method may be performed by one or more processors. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

What is claimed is:

1. A method comprising:
   accessing, from memory, an integrated circuit design comprising a clock tree that interconnects a clock source to a plurality of clock sinks, each individual clock sink in the plurality of clock sinks having an associated current insertion delay;
   determining a mean insertion delay of the plurality of clock sinks based on the associated current insertion delays of the plurality of clock sinks;
   setting a target insertion delay for the plurality of clock sinks based on the mean insertion delay;
   determining a target insertion delay adjustment for each individual clock sink of the plurality of clock sinks;
   identifying one or more clock sinks of the plurality of clock sinks that have a target insertion delay adjustment exceeding a skew threshold value; and
   modifying the clock tree to reduce the target insertion delay adjustment, for each identified clock sink of the one or more clock sinks, to less than or equal to the skew threshold value, the modifying comprising moving the identified clock sink in the clock tree to a new position in the clock tree, the new position of the identified clock sink adjusting the current insertion delay of the identified clock sink to reduce the target insertion delay adjustment of the identified clock sink to less than or equal to the skew threshold value.

2. The method of claim 1, wherein the setting of the target insertion delay for the plurality of clock sinks comprises setting the target insertion delay equal to the determined mean insertion delay.

3. The method of claim 1, wherein the determining of the target insertion delay adjustment for each individual clock sink of the plurality of clock sinks comprises determining a difference between the associated current insertion delay of the individual clock sink and the target insertion delay.

4. The method of claim 3, wherein the identifying of the one or more clock sinks that have the target insertion delay adjustment exceeds the skew threshold value comprises identifying the one or more clock sinks for which a magnitude of the difference exceeds the skew threshold value.

5. The method of claim 1, wherein the skew threshold value is equal to one-half of a skew target value for the plurality of clock sinks.

6. The method of claim 1, comprising:
   calculating a standard deviation of the associated current insertion delays of the plurality of clock sinks; and in response to twice the standard deviation being less than one-half a skew target value for the plurality of clock sinks, setting the skew threshold value to be equal to twice the standard deviation.

7. The method of claim 1, wherein the modifying of the clock tree comprises, for each identified clock sink of the one or more clock sinks, adjusting at least one of position or sizing of one or more neighboring clock instances in the clock tree to accommodate the new position of the identified clock sink.

8. A method, comprising:
accessing, from memory, an integrated circuit design comprising a clock tree that interconnects a clock source to a plurality of clock sinks, each individual clock sink in the plurality of clock sinks having an associated current insertion delay;
identifying a targeted subset of clock sinks and a non-targeted subset of clock sinks in the plurality of clock sinks, the plurality of clock sinks collectively including the targeted subset of clock sinks and non-targeted subset of clock sinks;
determining a mean insertion delay of the non-targeted subset of clock sinks based on the associated current insertion delays of the plurality of non-targeted clock sinks;
setting a target insertion delay for the plurality of clock sinks in the targeted subset of clock sinks based on the mean insertion delay;
determining a target insertion delay adjustment for each of the plurality of clock sinks in the targeted subset of clock sinks;
identifying, in the targeted subset of clock sinks, one or more clock sinks having a target insertion delay adjustment exceeding a skew threshold value; and
modifying the clock tree to reduce the target insertion delay adjustment, for each identified clock sink in the targeted subset of clock sinks, to less than or equal to the skew threshold value, the modifying comprising moving the identified clock sink in the clock tree to a new position in the clock tree, the new position of the identified clock sink adjusting the current insertion delay of the identified clock sink to reduce the target insertion delay adjustment of the identified clock sink to less than or equal to the skew threshold value.

9. The method of claim 8, comprising receiving a user request identifying the targeted subset of clock sinks.

10. The method of claim 8, wherein the skew threshold value is equal to one-half of a skew target value for the targeted subset of clock sinks.

11. The method of claim 8, comprising setting the target insertion delay equal to the determined mean insertion delay.

12. The method of claim 8, comprising determining a difference between the associated current insertion delay of the individual clock sink and the target insertion delay.

13. A system comprising:
one or more processors, and
a memory storing instructions that, when executed by the one or more processors, cause the system to:
access, from the memory, an integrated circuit design comprising a clock tree that interconnects a clock source to a plurality of clock sinks, each individual clock sink in the plurality clock sinks having an associated current insertion delay;
determine a mean insertion delay of the plurality of clock sinks based on the associated current insertion delays of the plurality of clock sinks;
set a target insertion delay for the plurality of clock sinks based on the mean insertion delay;
determine a target insertion delay adjustment for each individual clock sink of the plurality of clock sinks;
identify one or more clock sinks of the plurality of clock sinks that have a target insertion delay adjustment that exceeds a skew threshold value; and
modify the clock tree to reduce the target insertion delay adjustment, for each identified clock sink of the one or more clock sinks, to less than or equal to the skew threshold value, the clock tree being modified by moving the identified clock sink in the clock tree to a new position in the clock tree, the new position of the identified clock sink adjusting the current insertion delay of the identified clock sink to reduce the target insertion delay adjustment of the identified clock sink to less than or equal to the skew threshold value.

14. The system of claim 13, wherein to set the target insertion delay for the plurality of clock sinks comprises set the target insertion delay equal to the determined mean insertion delay.

15. The system of claim 13, wherein to determine the target insertion delay adjustment for each individual clock sink of the plurality of clock sinks comprises determine a difference between the associated current insertion delay of the individual clock sink and the target insertion delay.

16. The system of claim 13, wherein the skew threshold value is equal to one-half of a skew target value for the plurality of clock sinks.

17. The system of claim 13, wherein the instructions cause the system to:
calculate a standard deviation of the current insertion delays of the plurality of clock sinks; and
set the skew threshold value to be equal to twice the standard deviation when twice the standard deviation is less than one-half a skew target value for the plurality of clock sinks.

18. The system of claim 13, wherein to modify the clock tree comprises, for each of the identified clock sinks of the one or more clock sinks, adjust at least one of position or sizing of one or more neighboring clock instances in the clock tree to accommodate the new position of the identified clock sink.

19. The system of claim 13, wherein the plurality of clock sinks collectively include a targeted subset of clock sinks and a non-targeted subset of clock sinks, the targeted subset of clock sinks corresponding to clock sinks to having current insertion delays that are to be adjusted;
wherein to determine the mean insertion delay comprises to determine the mean insertion delay of the non-targeted subset of clock sinks based on the current insertion delays of the individual clock sinks in the non-targeted subset of clock sinks;
wherein to set the target insertion delay comprises to set the target insertion delay for the plurality of clock sinks in the targeted subset of clock sinks based on the mean insertion delay;
wherein to determine the target insertion delay adjustment for each of the plurality of clock sinks comprises to determine the target insertion delay adjustment for each of the plurality of clock sinks in the targeted subset of clock sinks;
wherein to identify one or more clock sinks comprises to identify, in the targeted subset of clock sinks, one or more clock sinks having a target insertion delay adjustment exceeding the skew threshold value; and wherein to modify the clock tree comprises, to modify the clock tree to reduce the target insertion delay adjustment, for each of the one or more identified clock sinks in the targeted subset of clock sinks, to less than or equal to the skew threshold value.

20. The system of claim 13, wherein the system moves the identified clock sink up or down in the clock tree to thereby move the identified clock sink to the new position.

\* \* \* \* \*